US011354061B2

(12) United States Patent
Prado et al.

(10) Patent No.: US 11,354,061 B2
(45) Date of Patent: Jun. 7, 2022

(54) STORAGE SYSTEM CONFIGURATION BASED ON WORKLOAD CHARACTERISTICS AND PERFORMANCE METRICS

(71) Applicant: EMC IP Holding Company LLC, Hopkinton, MA (US)

(72) Inventors: Adriana Bechara Prado, Niteroi (BR); Pablo Nascimento Da Silva, Niteroi (BR); Paulo Abelha Ferreira, Rio de Janeiro (BR)

(73) Assignee: EMC IP Holding Company LLC, Hopkinton, MA (US)

( * ) Notice: Subject to any disclaimer, the term of this patent is extended or adjusted under 35 U.S.C. 154(b) by 127 days.

(21) Appl. No.: 16/746,238

(22) Filed: Jan. 17, 2020

(65) Prior Publication Data

US 2021/0223982 A1    Jul. 22, 2021

(51) Int. Cl.
*G06F 3/06* (2006.01)
*G06F 11/30* (2006.01)
*G06F 9/50* (2006.01)
*G06N 3/04* (2006.01)

(52) U.S. Cl.
CPC .......... *G06F 3/0653* (2013.01); *G06F 3/0611* (2013.01); *G06F 3/0614* (2013.01); *G06F 3/0683* (2013.01); *G06F 9/5011* (2013.01); *G06F 11/3006* (2013.01); *G06F 11/3034* (2013.01); *G06F 11/3075* (2013.01); *G06N 3/0454* (2013.01); *G06F 2209/508* (2013.01); *G06F 2209/5019* (2013.01)

(58) Field of Classification Search
CPC .... G06F 3/0611; G06F 3/0614; G06F 3/0653; G06F 3/0683; G06F 9/5011; G06F 11/3006; G06F 11/3034; G06F 11/3075; G06F 2209/5019; G06F 2209/508; G06N 3/0454

See application file for complete search history.

(56) References Cited

U.S. PATENT DOCUMENTS

| | | | | |
|---|---|---|---|---|
| 9,507,887 | B1 * | 11/2016 | Wang | G06F 3/0685 |
| 9,888,078 | B2 * | 2/2018 | Jain | G06F 3/0689 |
| 10,095,425 | B1 * | 10/2018 | Martin | G06F 3/0665 |
| 2014/0089495 | A1 * | 3/2014 | Akolkar | H04L 41/147 709/224 |
| 2016/0092134 | A1 * | 3/2016 | Raitto | G06F 3/0608 711/118 |

(Continued)

*Primary Examiner* — Eric T Oberly
(74) *Attorney, Agent, or Firm* — Krishnendu Gupta; Nikhil Patel

(57) ABSTRACT

One or more aspects of the present disclosure relate to providing storage system configuration recommendations. System configurations of one or more storage devices can be determined based on their respective collected telemetry information. Performance of storage devices having different system configurations can be predicted based on one or more of: the collected telemetry information and each of the different system configurations. In response to receiving one or more requested performance characteristics and workload conditions, one or more recommended storage device configurations can be provided for each request based on the predicted performance characteristics, the requested performance characteristics, and the workload conditions.

20 Claims, 5 Drawing Sheets

(56) References Cited

U.S. PATENT DOCUMENTS

| | | |
|---|---|---|
| 2017/0149627 A1* | 5/2017 | Blondeau ............ H04L 41/5016 |
| 2017/0286252 A1* | 10/2017 | Illikkal ............... G06F 11/3442 |
| 2019/0007284 A1* | 1/2019 | Doshi ................... H04L 43/065 |
| 2019/0042129 A1* | 2/2019 | Tarango .................. G06F 3/067 |
| 2019/0042386 A1* | 2/2019 | Barczak .............. G06F 11/3452 |

* cited by examiner

STORAGE SYSTEM CONFIGURATION BASED ON WORKLOAD CHARACTERISTICS AND PERFORMANCE METRICS

BACKGROUND

A storage area network (SAN) is a dedicated high-speed network that interconnects and presents shared pools of storage devices to multiple servers. A SAN moves storage resources off common user networks and reorganizes them into an independent, high-performance network. This enables each server to access shared storage as if it were a drive directly attached to the server. Accordingly, host devices can send block-based access requests to access any storage device on the SAN.

A SAN is typically assembled using three principle components: cabling, host bus adapters (HBAs), and switches attached to storage arrays and servers. Each switch and storage system on the SAN are usually interconnected, and physical interconnections generally support bandwidth levels that can adequately handle peak data activities.

SUMMARY

One or more aspects of the present disclosure relate to providing storage system configuration recommendations. System configurations of one or more storage devices can be determined based on their respective collected telemetry information. Performance of storage devices having different system configurations can be predicted based on one or more of: the collected telemetry information and each of the different system configurations. In response to receiving one or more requested performance characteristics and workload conditions, one or more recommended storage device configurations can be provided for each request based on the predicted performance characteristics, the requested performance characteristics, and the workload conditions.

In embodiments, the telemetry information can be collected from at least one or more of: one or more field-deployed storage devices or one or more lab operated storage device.

In embodiments, collecting the telemetry information can include controlling a telemetry collection device in each storage device to collect and transmit the telemetry information during one or more predetermined time-windows.

In embodiments, the telemetry information can include one or more of: each storage device's system configuration, each storage device's input/output (I/O) workloads, and each storage device's performance characteristics associated with the workload conditions. Additionally, each storage device's performance characteristics can be defined at least by their respective response times.

In embodiments, the telemetry information can be segmented based on one or more of: industry, workload types, performance characteristics, input/output (I/O) operations, and service level (SL) performance tiers of each storage device. Further, each storage device's response times can be segmented into each storage device's SL performance tiers. In addition, workload conditions can be characterized at least by amounts of read and write (RNV) I/O operations of each storage device's workload.

In embodiments, for one or more sets of storage device, performance characteristics can be predicted by predicting each storage device's performance characteristics using one or more prediction model built for each set of storage devices by processing each storage device's telemetry information using one or more machine learning techniques. The one or more machine learning techniques can include at least a non-linear regression learning technique, amongst other machine learning techniques. The non-linear regression technique includes at least one or more of a random forest and neural network techniques, amongst other machine learning techniques.

In embodiments, the performance characteristics can be predicted based on at least one or more of each storage device's system configurations and workloads present in the collected telemetry information, amongst other data. The telemetry information can be processed using the one or more machine learning techniques augmented with each storage device's uncollected telemetry information and validated telemetry information.

In embodiments, each storage device's uncollected and validated telemetry information can include at least one or more of each storage device's validated system configurations and validated workloads not present in each storage device's collected telemetry information.

In embodiments, for one or more sets of storage devices, one or more system configuration prediction models can be built to determine probabilities of each recommended storage device configuration meeting each storage device's SL performance tiers under one or more different workload conditions.

In embodiments, each different workload condition can be based on one or more anticipated workloads. Each of the one or more anticipated workloads can be predicted using one or more machine learning techniques to process one or more of: a customer type associated with each requested performance characteristic, the collected telemetry information, and uncollected telemetry information.

BRIEF DESCRIPTION OF THE DRAWINGS

The foregoing and other objects, features and advantages will be apparent from the following more particular description of the embodiments, as illustrated in the accompanying drawings in which like reference characters refer to the same parts throughout the different views. The drawings are not necessarily to scale, emphasis instead being placed upon illustrating the principles of the embodiments.

DETAILED DESCRIPTION

Customers of storage devices such as those implemented as part of a storage area network (SAN) have unique data storage requirements and corresponding performance requirements (e.g. response time expectations). Accordingly, each customer may require storage devices having system configurations designed to meet those requirements such as sizing.

A storage device's sizing defines its infrastructure that supports a customer's requirements such as workload and performance characteristics (e.g., response times). However, current sizing techniques may not predict whether a storage device's sized infrastructure can satisfy a customer's required performance characteristics under different workloads (e.g., such as those received from an end user applications).

Embodiments of the present disclosure collect telemetry data from storage systems to map workload and performance characteristics to recommended storage system configurations.

For example, using telemetry data (e.g., component performance profiles, component action records, and component event records) from one or more storage devices, the embodiments can model relationships between storage system configurations parameters. The embodiments can utilize one or more machine learning networks and/or techniques to generate the model relationships from the telemetry data.

The parameters can include storage model, number of flash or spin disks, number of engines, characteristics of workloads processed by field deployed and/or lab operated storage systems. The characteristics can include, e.g., number of cache read/write hits/misses, size of reads/writes, and measured response times, amongst other characteristics. Field deployed storage systems can include those systems being operated by existing customers of a storage system vendor.

Using the model relationships, the embodiments can estimate response times of each possible storage device configuration in response to receiving workloads included in the telemetry data. The embodiments can utilize one or more machine learning techniques and/or techniques to generate estimated response times from the model relationships and/or the telemetry data.

Further, the embodiments can perform one or more inverse mapping techniques, to generate one or more sets of recommended system configurations for any given set of workload and performance characteristics (e.g., those related to each customer's service level agreements (SLAs)). The one or more inverse mapping techniques can include using a probabilistic machine learning classifier that ingests the estimated response times output from the model relationships.

Figure 1:
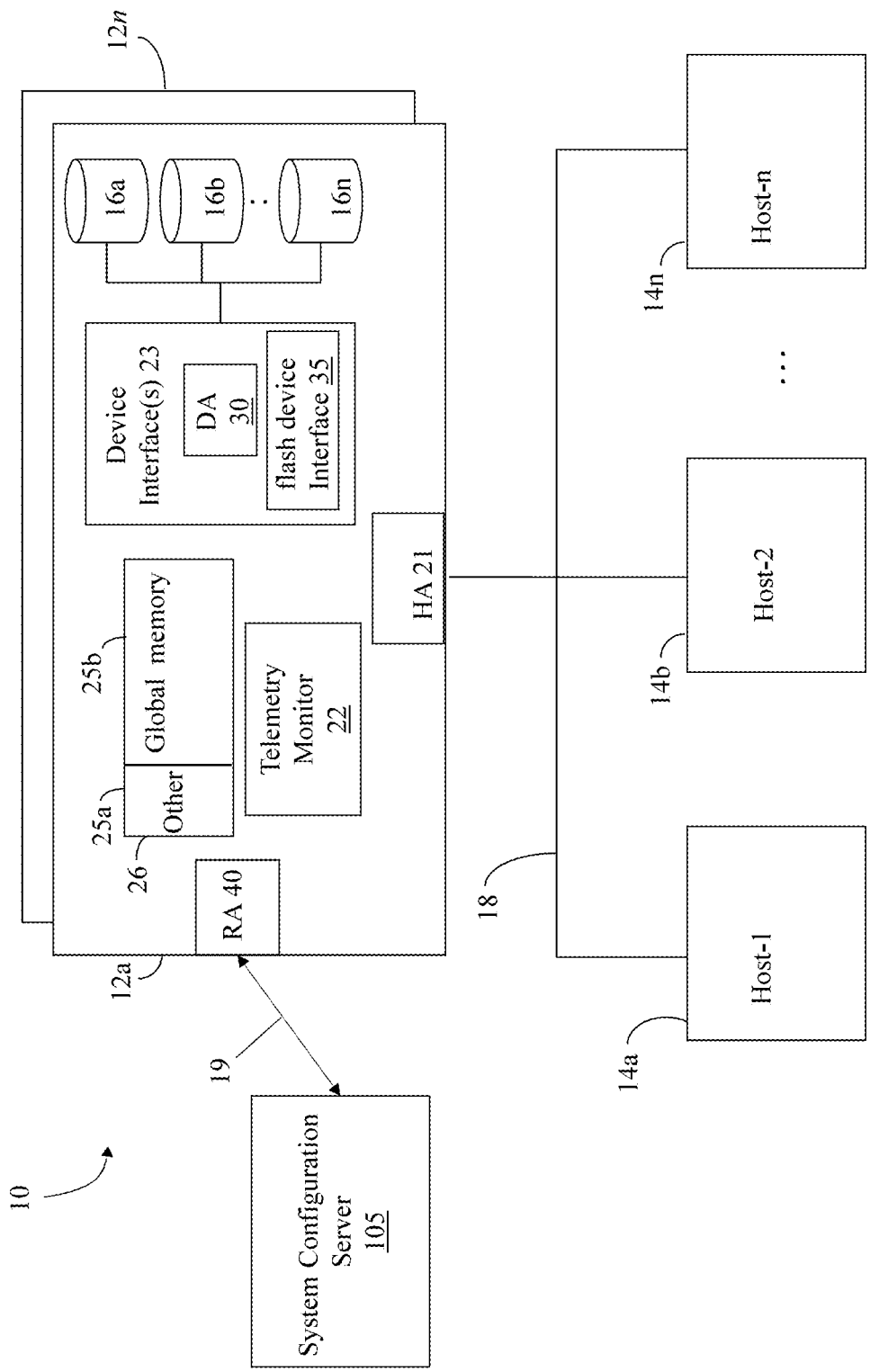
FIG. 1 is a block diagram of a storage system in accordance with example embodiments disclosed herein.

Referring to FIG. 1, an example system 10 includes data storage systems 12a-n (collectively referred to herein as "data storage system 12" or system 12). The system 12 is connected to host systems 14a-14n and server 105 through respective communication mediums 18-19. In embodiments, the hosts 14a-14n can access the data storage system 12, for example, to perform input/output (I/O) operations or data requests. The communication mediums 18-19 can be any one or more of a variety of networks or other type of communication connections as known to those skilled in the art. In embodiments, the communication mediums 18-19 may be a network connection, bus, and/or other type of data link, such as a hardwire or other connections known in the art. For example, the communication mediums 18-19 may be the Internet, an intranet, network (including a Storage Area Network (SAN)) or other wireless or other hardwired connection(s) by which the host 14a-14n can access and communicate with the data storage system 12. The hosts 14a-14n can also communicate with other components included in the system 10 via the communication mediums 18-19.

Each of the hosts 14a-14n and the data storage system 12 can be connected to the communication medium 18 by any one of a variety of connections as may be provided and supported in accordance with the type of communication medium 18. The processors included in the hosts 14a-14n may be any one of a variety of proprietary or commercially available single or multi-processor system, such as an Intel-based processor, or other type of commercially available processor able to support traffic in accordance with each embodiment and application.

It should be noted that the examples of the hardware and software that may be included in the data storage system 12 are described herein in more detail and can vary with each embodiment. Each of the hosts 14a-14n and data storage system 12 can all be located at the same physical site or can be located in different physical locations. Examples of the communication medium 18 that can be used to provide the different types of connections between the host computer systems and the data storage system of the system 10 can use a variety of different communication protocols such as SCSI, Fibre Channel, iSCSI, and the like. Some or all the connections by which the hosts 14a-14n and data storage system 12 can be connected to the communication medium may pass through other communication devices, such switching equipment that may exist such as a phone line, a repeater, a multiplexer or even a satellite.

Each of the hosts 14a-14n can perform different types of data operations in accordance with different types of tasks. In embodiments, any one of the hosts 14a-14n may issue a data request to the data storage system 12 to perform a data operation. For example, an application executing on one of the hosts 14a-14n can perform a read or write operation resulting in one or more data requests to the data storage system 12.

It should be noted that although element 12 is illustrated as a single data storage system, such as a single data storage array, element 12 may also represent, for example, multiple data storage arrays alone, or in combination with, other data storage devices, systems, appliances, and/or components having suitable connectivity, such as in a SAN, in an embodiment using the embodiments herein such as external storage device(s) 105. It should also be noted that an embodiment may include data storage arrays or other components from one or more vendors. In subsequent examples illustrated the embodiments herein, reference may be made to a single data storage array by a vendor, such as by DELL Technologies of Hopkinton, Mass. However, as will be appreciated by those skilled in the art, the embodiments herein are applicable for use with other data storage arrays by other vendors and with other components than as described herein for purposes of example.

The data storage system 12 may be a data storage array including a plurality of data storage devices 16a-16n. The data storage devices 16a-16n may include one or more types of data storage devices such as, for example, one or more disk drives and/or one or more solid state drives (SSDs). An SSD is a data storage device that uses solid-state memory to store persistent data. An SSD using SRAM or DRAM, rather than flash memory, may also be referred to as a RAM drive. SSD may refer to solid state electronics devices as distinguished from electromechanical devices, such as hard drives, having moving parts. Flash devices or flash memory-based SSDs are one type of SSD that contains no moving parts. The embodiments described herein can be used in an embodiment in which one or more of the devices 16a-16n are flash drives or devices. More generally, the embodiments herein may also be used with any type of SSD although following paragraphs can refer to a particular type such as a flash device or flash memory device.

The data storage array 12 may also include different types of adapters or directors, such as an HA 21 (host adapter), RA 40 (remote adapter), and/or device interface 23. Each of the adapters HA 21, RA 40 may be implemented using hardware including a processor with local memory with code stored thereon for execution in connection with performing different operations. The HA 21 may be used to manage communications and data operations between one or more host systems 14a-14n and the global memory (GM) 25b. In an embodiment, the HA 21 may be a Fibre Channel Adapter (FA) or another adapter which facilitates host communication. The HA 21 may be characterized as a front-end component of the data storage system 12 which receives a request from one or more of the hosts 14a-14n. The data storage array 12 can include one or more RAs (e.g., RA 40) that may be used, for example, to facilitate communications between data storage arrays (e.g., between the storage array 12 and the external storage device(s) 105). The data storage array 12 may also include one or more device interfaces 23 for facilitating data transfers to/from the data storage devices 16a-16n. The data storage interfaces 23 may include device interface modules, for example, one or more disk adapters (DAs) 30 (e.g., disk controllers), flash drive interface 35, and the like. The DA 30 can be characterized as a back-end component of the data storage system 12 which interfaces with the physical data storage devices 16a-n.

One or more internal logical communication paths may exist between the device interfaces 23, the RAs 40, the HAs 21, and the memory 26. An embodiment, for example, may use one or more internal busses and/or communication modules. For example, the global memory 25b may be used to facilitate data transfers and other communications between the device interfaces, HAs and/or RAs in a data storage array. In one embodiment, the device interfaces 23 may perform data operations using a cache that may be included in the global memory 25b, for example, when communicating with other device interfaces and other components of the data storage array. The other portion 25a is that portion of memory that may be used in connection with other designations that may vary in accordance with each embodiment.

The data storage system as described in this embodiment, or a device thereof, such as a disk or aspects of a flash device, should not be construed as a limitation. Other types of commercially available data storage systems, as well as processors and hardware controlling access to these devices, may also be included in an embodiment.

Host systems 14a-14n provide data and access control information through channels to the storage systems 12, and the storage systems 12 may also provide data to the host systems 14a-14n also through the channels. The host systems 14a-14n do not address the drives or devices 16a-16n of the storage systems directly, but rather access to data can be provided to one or more host systems 14a-n from what the host systems view as a plurality of logical devices or logical volumes (LVs). The LVs may or may not correspond to the actual physical devices or drives 16a-16n. For example, one or more LVs may reside on a single physical drive or multiple drives. Data in a single data storage system, such as a single data storage array 12, may be accessed by multiple hosts allowing the hosts to share the data residing therein. The HA 21 may be used in connection with communications between a data storage array 12 and one or more of the host systems 14a-n. The RA 40 may be used in facilitating communications between two or more data storage arrays (e.g., device 12 and external device(s) 105). The DA 30 may be one type of device interface used in connection with facilitating data transfers to/from the associated disk drive(s) 16a-n and LV(s) residing thereon. A flash device interface 35 may be another type of device interface used in connection with facilitating data transfers to/from the associated flash devices and LV(s) residing thereon. It should be noted that an embodiment may use the same or a different device interface for one or more different types of devices than as described herein.

The device interface, such as a DA 30, performs I/O operations on a drive 16a-16n. In the following description, data residing on an LV may be accessed by the device interface following a data request in connection with I/O operations that other directors originate. Data may be accessed by LV in which a single device interface manages data requests in connection with the different one or more LVs that may reside on a drive 16a-16n. For example, a device interface may be a DA 30 that accomplishes the foregoing by creating job records for the different LVs associated with a device. These different job records may be associated with the different LVs in a data structure stored and managed by each device interface.

A telemetry monitor 22 can dynamically monitor the storage device 12 to collect a wide array (e.g. storage device telemetry data), both real-time/current and historical. Similarly, the telemetry monitor 22 can receive similar data from the external storage device(s). The monitor can transmit the collected telemetry data to a system configuration server 105, e.g., via communication medium 19.

In embodiments, the monitor 22 can collect data from the storage device and its components, e.g., Fibre channels. The components can include any of the elements 16a-b, 21-23, 25a-b, 26, 30, 35, and 40, amongst other known storage device components. Additionally, the monitor 22 can receive component data corresponding to one or more external device components from another storage device (e.g., device 12n) via RA 40. The collected data can be real-time and/or historical storage device telemetry data.

The server 105 can analyze the data, e.g., using one or more machine learning techniques to provide recommended storage device configurations as described herein. In embodiments, the machine learning (ML) techniques can include one or more non-linear techniques, such as neural networks or random forests, amongst other known or yet to be known ML techniques.

Although the telemetry monitor 22 is depicted within the system 12, it should be noted that a telemetry monitor 22 may exist external to the system 12. Accordingly, the telemetry monitor 22 may communicate with the data storage system 12 using any one of a variety of communication connections. In one embodiment, the telemetry monitor 22 may communicate with the data storage system 12 through three different connections, a serial port, a parallel port and using a network interface card, for example, with an Ethernet connection. Using the Ethernet connection, for example, a device configuration processor may communicate directly with DA 30, HA 21, and/or RA 40 of the data storage system 12. In other embodiments, the telemetry monitor 22 may be implemented via a cloud-based hosted solution (e.g., remote server) that communicates with the system 12 and/or the server 105 via a network (e.g., Internet, local area network (LAN), wide area network (WAN), amongst others).

Figure 2:
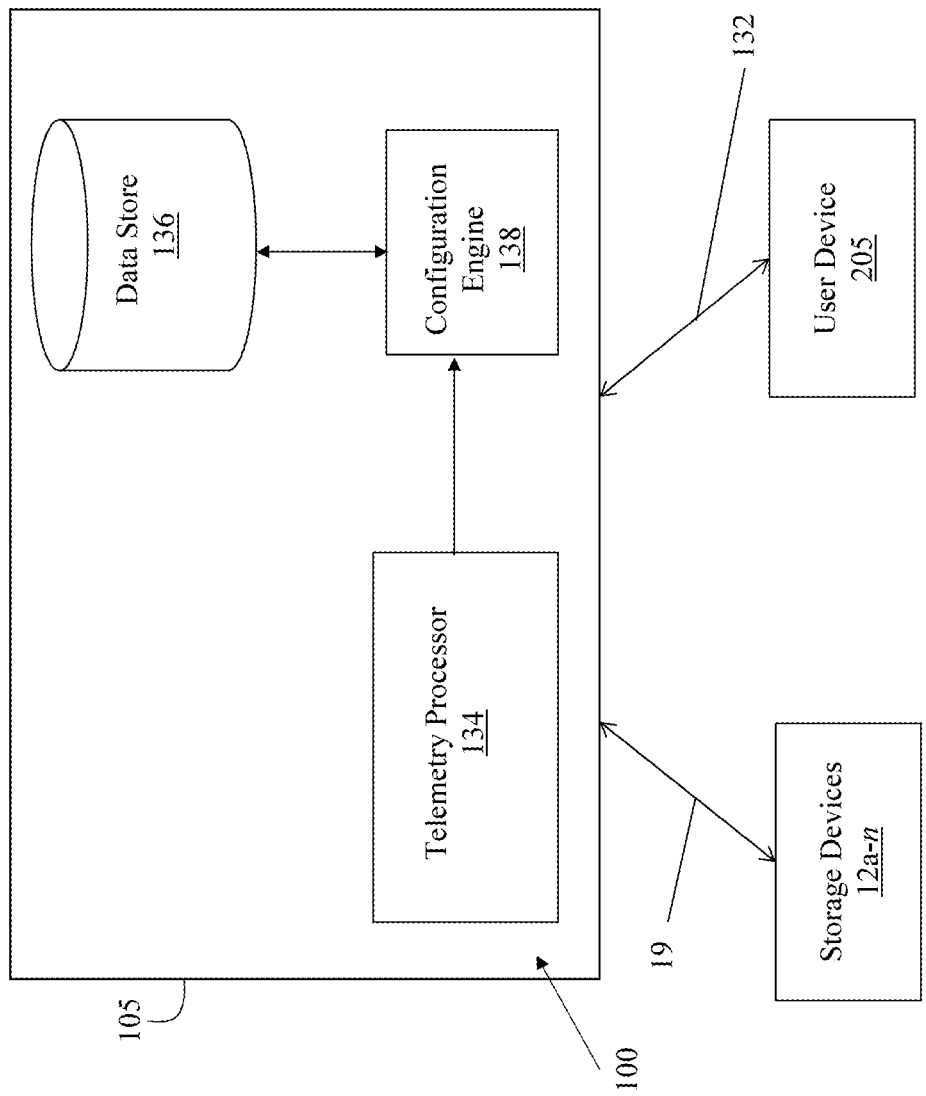
FIG. 2 is a block diagram of a storage system configuration server in accordance with example embodiments disclosed herein.

Referring to FIG. 2, a server 105 can be communicatively coupled to storage devices 12a-n (e.g., such as device 12 of FIG. 1) via communications medium 19 (e.g., medium 19 of FIG. 1) and receive telemetry data from each device's telemetry monitor (e.g., monitor 22 of FIG. 1). In embodiments, the server 105 can include elements 100 (e.g., software and hardware/circuitry elements) configured to process the telemetry data as discussed herein.

It should be noted that the elements 100 may be any one of a variety of commercially available processors, such as an Intel-based processor, and the like. In embodiments, elements 100 can be a parallel processor such as a graphical processing unit (GPU). Although what is described herein shows details of software/hardware that may reside in the server 105, all or portions of the illustrated components may also reside elsewhere such as on a storage device and/or storage device component (e.g., HA 21, DA 30, RA 40 of FIG. 1).

Advantageously, using the ML techniques described herein, the server 105 can provide a customer with a list of system configurations predicted to most likely satisfy a customer's Service Level Agreement (SLA) in view of a variety of expected and/or unexpected workload conditions as described herein.

For example, the server 105 can leverage the availability of real telemetry data (i.e., data from field deployed storage devices) to recommend storage system configurations that satisfy a customer's performance requirements. For example, the server 105 can analyze the telemetry data to predict performance characteristics of any possible storage device configuration. The server 105 can further use the predictions to recommend one or more storage configurations based on a customer's performance requirements.

For instance, each customer may have a performance expectation of a storage device such as those defined by each customer's Service Level Agreement (SLA). The performance expectation can be segmented into a set of service level (SL) tiers (e.g., SLA Categories (SLAcat)). Each SL tier can correspond to one or more response time envelopes for each application the customer expects to run. Further, each SL tier can be assigned a SL designation such as PLATINUM, GOLD, SILVER, and BRONZE. In embodiments, PLATINUM can correspond to the fastest response time envelopes, while BRONZE can correspond to the slowest response time envelopes. Each other SL designation can thus have response time envelopes between those corresponding to PLATINUM and BRONZE SL assignments.

In embodiments, the server 105 can include a telemetry processor 134 that receives and stores the telemetry data in data store 136 from each storage device. The processor 134 can receive the telemetry data using one or more push/pull data retrieval techniques. The telemetry data can include configuration data, workload data, and response times of each storage device. The data store 136 can also store available storage device configurations in a searchable data structure.

In embodiments, the processor 134 can store data using one or more data normalizing techniques. For example, the data normalizing technique can include identifying each data type included in the telemetry data. The normalizing technique can further include generating predetermined template formats for each data type. Thus, the processor 134 can transform each piece of data into a predetermined format corresponding to its data type.

Figure 3:
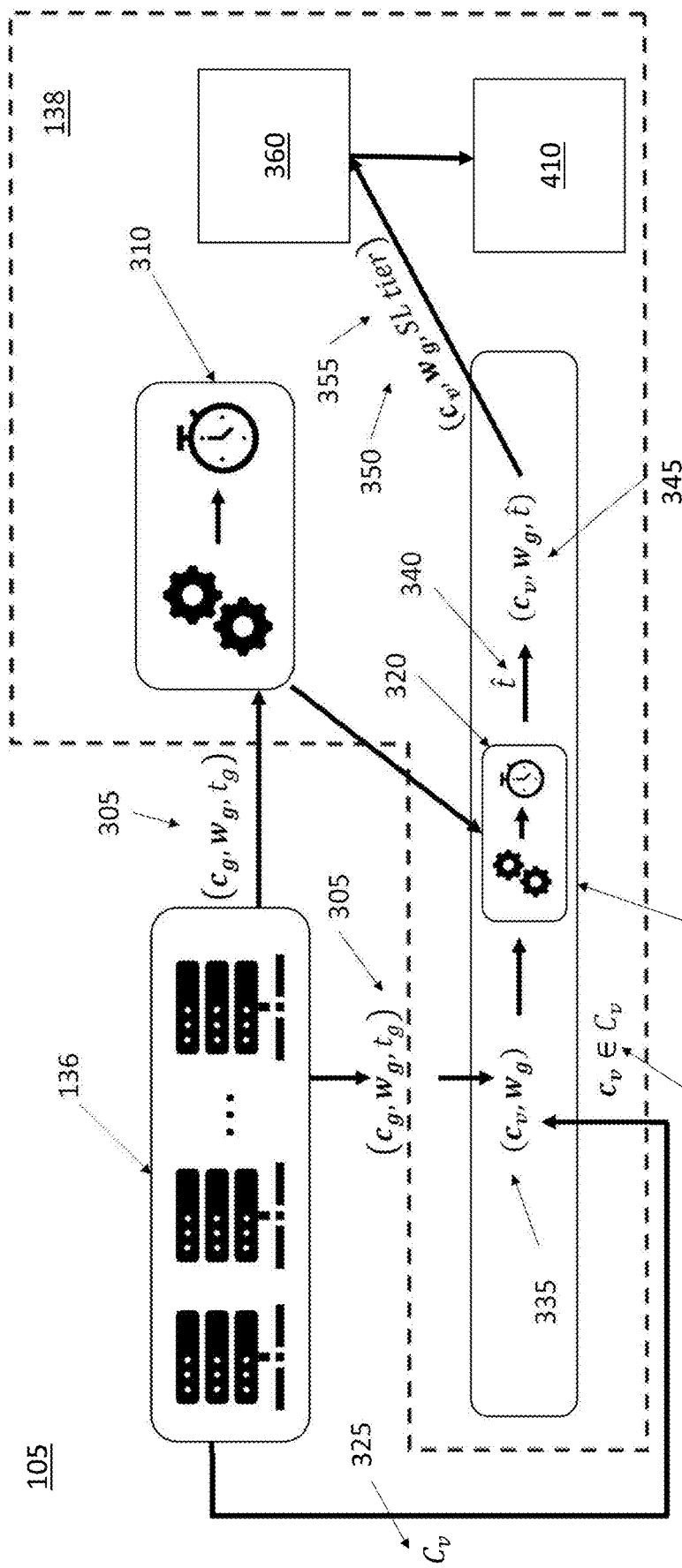
FIG. 3 is a detailed block diagram of a storage system configuration server in accordance with example embodiments disclosed herein.

The server 105 can include a configuration engine 138 configured to ingest and process the telemetry data use one or more machine learning (ML) techniques as described in greater detail with respect to FIG. 3. The ML techniques can generate one or more models that map workload characteristics and performance characteristics to one or more storage system configurations as described herein. Additionally, the ML techniques can further generate an engine that can recommend storage system configurations based on both seen/unseen workload and performance characteristics input, e.g., by a customer via user device 205 through communications medium 132 as described herein.

In embodiments, the processor 134 can generate a graphical user interface (GUI) that can request and acquire information corresponding to one or more applications each customer expects to run. Using the information, the configuration engine 138 can predict expected/unexpected workloads conditions a recommended storage device may encounter. Accordingly, the engine 138 can generate one or more recommended storage device configurations that can satisfy the predicted/expected workloads in view of each customer's SLA. For each recommended storage device configuration, the engine 138 can provide a probability corresponding to the configuration's ability to satisfy the customer's SLA in view of the predicted workloads.

Referring to FIG. 3, a storage system configuration server 105 (e.g., such as server 105 of FIGS. 1-2) includes a data store 136 and configuration engine 138, which are substantially similar to store 136 and engine 138 of FIG. 2. The data store 136 stores telemetry data received by a telemetry processor (e.g., processor 134 of FIG. 2) from one or more storage devices. The telemetry data can include information corresponding to system configurations, workloads, and response times, amongst other information of each storage device.

In embodiments, the engine 138 includes a response time model (RTM) generator 310 configured to ingest RTM training data 305 such as the system configurations ($c_g$), workloads ($w_g$), and response times ($t_g$), amongst other information of each storage device. Using one or more ML techniques, the RTM generator 310 processes the ingested RTM training data 305 and generates a response time (RT) engine 320. In embodiments, the RTM generator 310 can be communicatively coupled to the data store 136 such that it can generate a new/updated engine 320 in response new telemetry data stored by the data store 136. In embodiments, the RTM generator 310 can implement a ML technique such as a non-linear regression technique. The non-linear regression technique can include a random forest and/or a neural network.

The engine 138 can also include an RT processing thread 315 that can include hardware and/or software processing elements such as RT engine 320. The thread 315 can obtain a set of valid storage device configurations ($C_v$) 325 from the data store 136. In embodiments, the processor 134 of FIG. 2 can dynamically determine the set of valid configurations 325 based on the telemetry data of a plurality of storage devices. In other embodiments, the set of valid configurations 325 can be provided by a storage device vendor.

In embodiments, the thread 315 can obtain storage device workload information from data 305. For example, the thread 315 can parse the data 305 for metadata corresponding to a workload data type and extract the workload information from the data 305. Additionally, the thread 315 can identify each unique available device configuration ($c_v$) 330 from the set of device configurations 325. The thread 315 can match each unique available device configuration ($c_v$) 330 to each workload ($w_g$) to create a set of RT engine data pairs 335.

In embodiments, the thread 315 can feed the RT data 335 into RT engine 320. Using one or more ML techniques, the RT engine 320 can predict response times ($\hat{t}$) 340 for each RT data pair of the set 335. The RT engine 320 can then output predicted RT data structures 345 that associates each RT data pair 335 with its respective predicted response time ($\hat{t}$) 340.

As stated herein, a customer can require a recommended storage device to meet certain performance expectations. Those performance expectations can be segmented into a set of service level (SL) tiers. Each SL tier can correspond to a response time envelope for each application the customer expects to run.

In embodiments, the thread 315 can then match predicted RT data structure 345 with a customer's SL tier. For example, the thread 315 can match the predicted response time (t) 340 included in each data structure 345 with an SL tier 355 as defined by each customer's SLA. In response to identifying a match, the thread 315 can generate data set tiers 350 that includes RT data pair 335 and the matched SL tier 355.

In embodiments, the configuration engine 138 can include a probability classifier 410. The classifier 410 can be configured to provide recommend system configurations based on a customer's performance requirements in view of unseen and/or unknown workloads. Accordingly, the engine 168 can include a system probability engine 360 configured to generate the classifier 138.

In embodiments, the probability engine 360 can configured to receive and process the data set tiers 350 using one or more ML techniques. For instance, the ML technique can include one or more of a logistic regression technique, random forest classifier, and neural network classifier. By using such a logistic regression, the probabilistic classifier 410 is able to predict, given input values such as those included in each generate data set tier 350, a probability distribution over a set of classes, rather than only outputting a most likely class for any given input.

Figure 4:
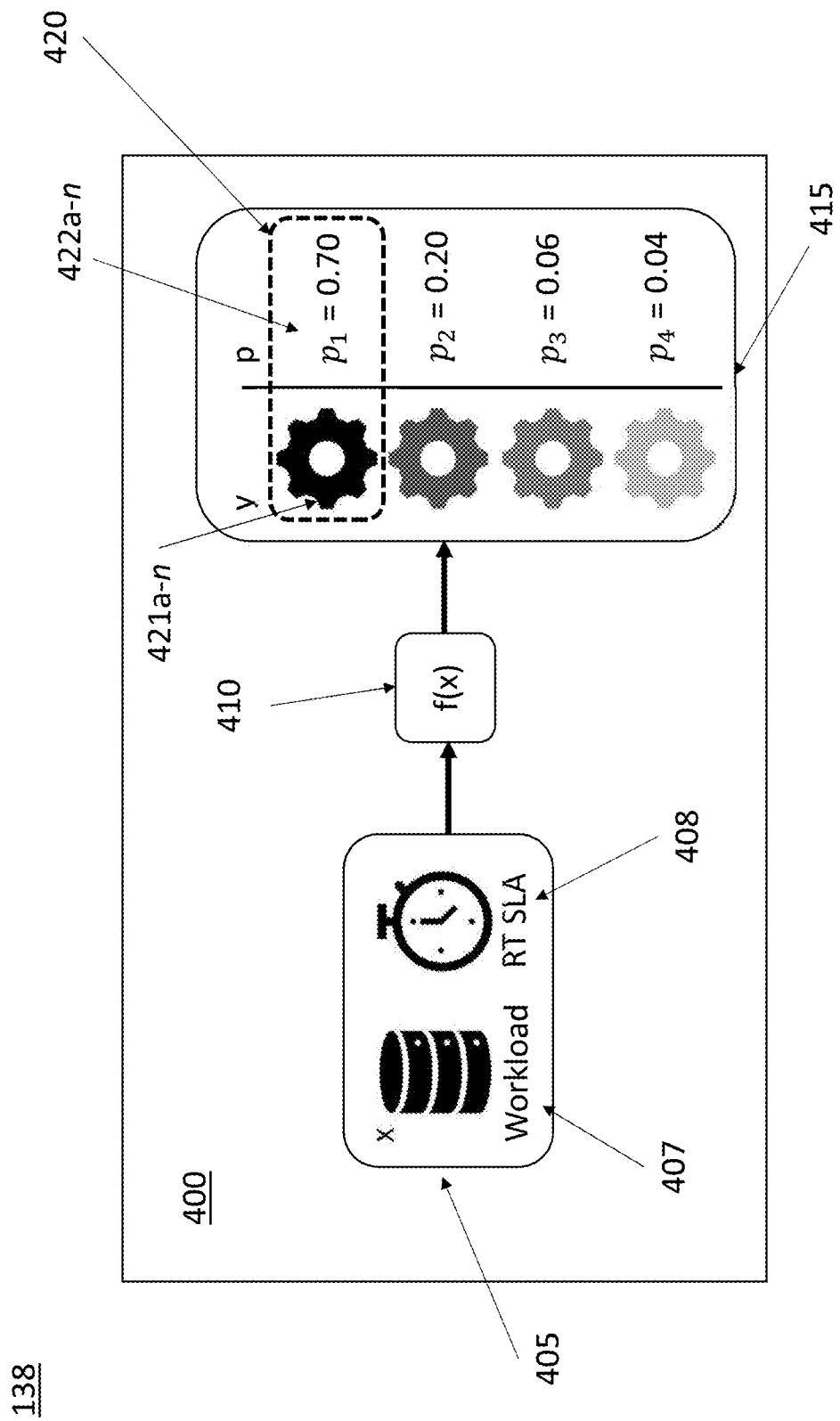
FIG. 4 is a block diagram of a probabilistic classifier in accordance with example embodiments disclosed herein.

Referring to FIG. 4, a configuration engine 138 (e.g., such as engines 138 of FIGS. 2-3) can include a system probability processing thread 400. The probability thread 410 can include a probability classifier 410.

In embodiments, the probability classifier 410 can be configured to provide recommended system configurations based on a customer's performance requirements in view of unseen and/or unknown workloads. Accordingly, the classifier 410 can function as an inverse mapping that provides a prediction of a probability distribution over a set of system configurations in response to receiving system input values. For example, the system input values can include workload characteristics 407 and performance characteristics 408 (e.g., response times and/or sets of performance envelopes (e.g., SL tiers)).

Accordingly, the processing thread 400 can include an interface 405 configured to receive data structures ("probability data") that include the workload characteristics 407 and performance characteristics 408. The interface 405 can prepare and provide the probability data to the classifier 410 according to any known technique.

In response to receiving the probability data, the classifier 410 can process the data using a probabilistic classification function. The probabilistic classification function can be configured to sort the probability data according to any known or yet to be known sorting technique. The function can generate and output predictions mapping 420 of the sorted probability data. The predictions mapping 420 can associate each predicted storage system configuration 421a-n to a probability 422a-n of each system configuration's ability to satisfy performance characteristics 408. In embodiments, the probabilities 422a-n corresponds to an expectation of a frequency the configuration can achieve the performance characteristics 408 given the workload 407.

Accordingly, system configurations with higher probabilities are those most likely to satisfy the performance characteristics 408.

Figure 5:
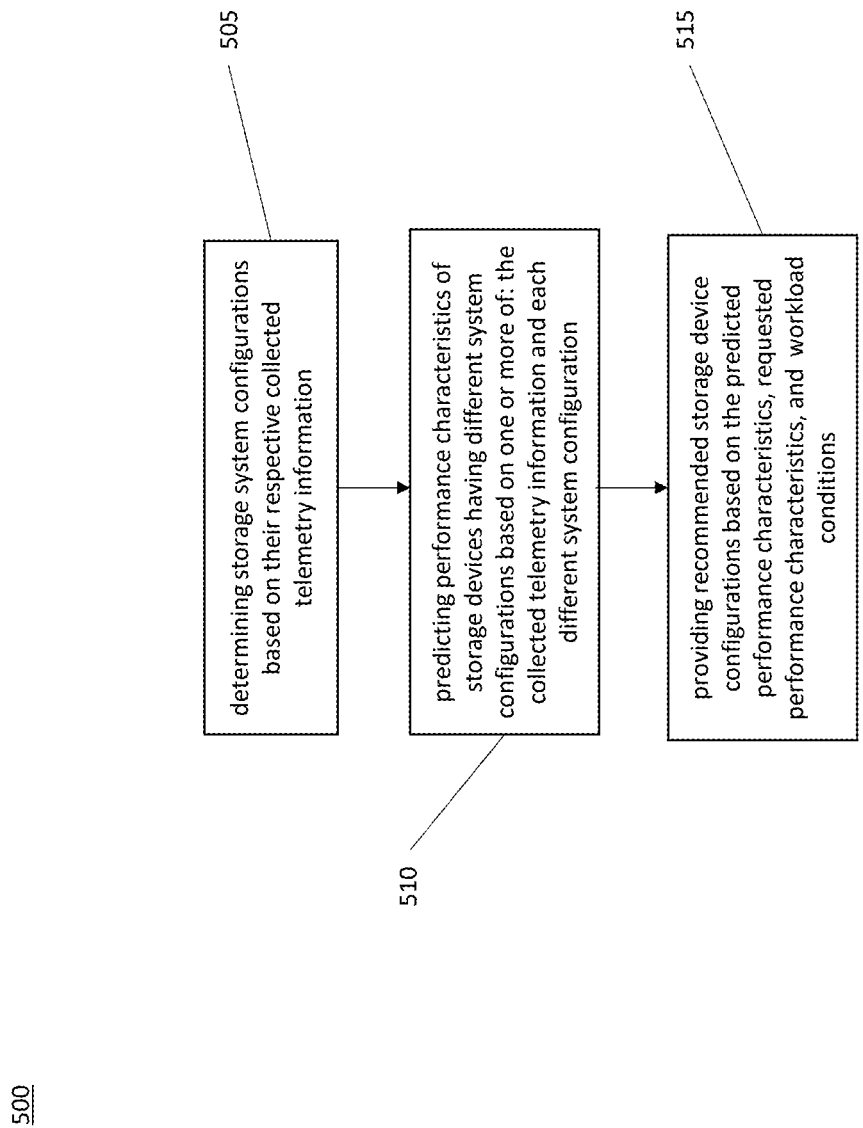
FIG. 5 is a flow diagram of a method for recommending storage system configurations in accordance with example embodiments disclosed herein.

FIG. 5 illustrates a method and/or flow diagram in accordance with this disclosure. For simplicity of explanation, the method is depicted and described as a series of acts. However, acts in accordance with this disclosure can occur in various orders and/or concurrently, and with other acts not presented and described herein. Furthermore, not all illustrated acts may be required to implement the method in accordance with the disclosed subject matter.

Regarding FIG. 5, a method 500 can be performed by, e.g., a server such as server 105 of FIGS. 1-4. The method 500, at 505, can include determining system configurations of each of one or more storage devices (e.g., devices 12a-n of FIG. 1) based on their respective collected telemetry information. At 510, the method 500 can include predicting performance characteristics of each of a plurality of storage devices having different system configurations based on one or more of: the collected telemetry information and each of the different system configurations. The method 500, at 515, can further include providing one or more recommended storage device configurations for each request based on the predicted performance characteristics, the requested performance characteristics, and the workload conditions in response to receiving one or more requested performance characteristics and workload conditions.

A skilled artisan understands that the method 500 and any of its steps 505-515 can be performed using any technique described herein.

The above-described systems and methods can be implemented in digital electronic circuitry, in computer hardware, firmware, and/or software. The implementation can be as a computer program product. The implementation can, for example, be in a machine-readable storage device, for execution by, or to control the operation of, data processing apparatus. The implementation can, for example, be a programmable processor, a computer, and/or multiple computers.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors executing a computer program to perform functions of the concepts described herein by operating on input data and generating output. Method steps can also be performed by and an apparatus can be implemented as special purpose logic circuitry. The circuitry can, for example, be a FPGA (field programmable gate array) and/or an ASIC (application-specific integrated circuit). Subroutines and software agents can refer to portions of the computer program, the processor, the special circuitry, software, and/or hardware that implement that functionality.

Processors suitable for the execution of a computer program include, by way of example, both general and special purpose microprocessors, and any one or more processors of any kind of digital computer. Generally, a processor receives instructions and data from a read-only memory or a random-access memory or both. The essential elements of a computer are a processor for executing instructions and one or more memory devices for storing instructions and data. Generally, a computer can include, can be operatively coupled to receive data from and/or transfer data to one or more mass storage devices for storing data (e.g., magnetic, magneto-optical disks, or optical disks).

Data transmission and instructions can also occur over a communications network. Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

To provide for interaction with a user, the above described techniques can be implemented on a computer having a display device. The display device can, for example, be a cathode ray tube (CRT) and/or a liquid crystal display (LCD) monitor. The interaction with a user can, for example, be a display of information to the user and a keyboard and a pointing device (e.g., a mouse or a trackball) by which the user can provide input to the computer (e.g., interact with a user interface element). Other kinds of devices can be used to provide for interaction with a user. Other devices can, for example, be feedback provided to the user in any form of sensory feedback (e.g., visual feedback, auditory feedback, or tactile feedback). Input from the user can, for example, be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributing computing system that includes a front-end component. The front-end component can, for example, be a client computer having a graphical user interface, a Web browser through which a user can interact with an example implementation, and/or other graphical user interfaces for a transmitting device. The components of the system can be interconnected by any form or medium of digital data communication (e.g., a communication network). Examples of communication networks include a local area network (LAN), a wide area network (WAN), the Internet, wired networks, and/or wireless networks.

The system can include clients and servers. A client and a server are generally remote from each other and typically interact through a communication network. The relationship of client and server arises by computer programs running on the respective computers and having a client-server relationship to each other.

Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks can include, for example, the public switched telephone network (PSTN), a private branch exchange (PBX), a wireless network (e.g., RAN, Bluetooth, code-division multiple access (CDMA) network, time division multiple access (TDMA) network, global system for mobile communications (GSM) network), and/or other circuit-based networks.

The transmitting device can include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer) with a world wide web browser (e.g., Microsoft® Internet Explorer® available from Microsoft Corporation, Mozilla® Firefox available from Mozilla Corporation). The mobile computing device includes, for example, a Blackberry®.

Comprise, include, and/or plural forms of each are open ended and include the listed parts and can include additional parts that are not listed. And/or is open ended and includes one or more of the listed parts and any combination of the listed parts.

One skilled in the art will realize the concepts described herein may be embodied in other specific forms without departing from the spirit or essential characteristics thereof. The foregoing embodiments are therefore to be considered in all respects illustrative rather than limiting of the concepts described herein. Scope of the concepts is thus indicated by the appended claims, rather than by the foregoing description, and all changes that come within the meaning and range of equivalency of the claims are therefore intended to be embraced therein.

What is claimed is:

1. An apparatus comprising at least one processor configured to:
   determine system configurations of each of one or more storage devices based on their respective collected telemetry information;
   predict performance characteristics of each of a plurality of storage devices having different system configurations based on one or more of: the collected telemetry information and each of the different system configurations, wherein the apparatus is further configured to:
   identify input/output (I/O) data types related to an I/O workload received by a storage array,
   generate response time (RT) data pairs, mapping each uniquely available system configuration and one or more of the I/O workload and I/O data types to respective response times, and
   in response to receiving one or more requested performance characteristics and current workload conditions, provide one or more recommended storage device configurations for each request based on the predicted performance characteristics, the requested performance characteristics, and the workload conditions.

2. The apparatus of claim 1, wherein the telemetry information is collected from at least one or more of: one or more field-deployed storage devices or one or more lab operated storage device.

3. The apparatus of claim 1, wherein collecting the telemetry information includes controlling a telemetry collection device in each storage device to collect and transmit the telemetry information during one or more predetermined time-windows.

4. The apparatus of claim 3, wherein:
   the telemetry information includes one or more of: each storage device's system configuration, each storage device's input/output (I/O) workloads, and each storage device's performance characteristics associated with the workload conditions; and
   wherein each storage device's performance characteristics are defined at least by their respective response times.

5. The apparatus of claim 4 further configured to:
segment the telemetry information based on one or more of: industry, workload types, performance characteristics, input/output (I/O) operations, and service level (SL) performance tiers of each storage device;
wherein each storage device's response times are segmented into each storage device's SL performance tiers; and
wherein workload conditions are characterized at least by amounts of read and write (R/W) I/O operations of each storage device's workload.

6. The apparatus of claim 4 further configured to:
for one or more sets of storage devices, predict performance characteristics by at least using one or more prediction models built for each storage device, wherein each prediction model is built by processing each storage device's telemetry information using one or more machine learning techniques; and
wherein:
the one or more machine learning techniques includes at least a non-linear regression learning technique, amongst other machine learning techniques, and
the non-linear regression technique includes at least one or more of a random forest and a neural network, amongst other machine learning techniques.

7. The apparatus of claim 6 further configured to:
predict the performance characteristics based on at least one or more of each storage device's system configurations and workloads present in the collected telemetry information, amongst other data;
process the telemetry information using the one or more machine learning techniques augmented with each storage device's uncollected telemetry information and validated telemetry information.

8. The apparatus of claim 7, wherein each storage device's uncollected and validated telemetry information includes at least one or more of each storage device's validated system configurations and validated workloads not present in each storage device's collected telemetry information.

9. The apparatus of claim 1 further configured to:
for one or more sets of storage device, build one or more system configuration prediction models to determine probabilities of each recommended storage device configuration meeting each storage device's SL performance tiers under one or more different workload conditions.

10. The apparatus of claim 9, wherein:
each different workload condition is based on one or more anticipated workloads; and
each of the one or more anticipated workloads is predicted using one or more machine learning techniques to process one or more of: a customer type associated with each requested performance characteristic, the collected telemetry information, and uncollected telemetry information.

11. A method comprising:
determining system configurations of each of one or more storage devices based on their respective collected telemetry information;
predicting performance characteristics of each of a plurality of storage devices having different system configurations based on one or more of: the collected telemetry information and each of the different system configurations, wherein predicting performance characteristics further includes:
identifying input/output (I/O) data types related to an I/O workload received by a storage array,
generating response time (RT) data pairs, mapping each uniquely available system configuration and one or more of the I/O workload and I/O data types to respective response times, and
in response to receiving one or more requested performance characteristics and current workload conditions, providing one or more recommended storage device configurations for each request based on the predicted performance characteristics, the requested performance characteristics, and the workload conditions.

12. The method of claim 11, wherein the telemetry information is collected from at least one or more of: one or more field-deployed storage devices or one or more lab operated storage devices.

13. The method of claim 11, wherein collecting the telemetry information includes controlling a telemetry collection device in each storage device to collect and transmit the telemetry information during one or more predetermined time-windows.

14. The method of claim 13, wherein:
the telemetry information includes one or more of: each storage device's system configuration, each storage device's input/output (I/O) workloads, and each storage device's performance characteristics associated with the workload conditions; and
wherein each storage device's performance characteristics are defined at least by their respective response times.

15. The method of claim 14 further comprising:
segmenting the telemetry information based on one or more of: industry, workload types, performance characteristics, input/output (I/O) operations, and service level (SL) performance tiers of each storage device;
wherein each storage device's response times are segmented into each storage device's SL performance tiers; and
wherein workload conditions are characterized at least by amounts of read and write (R/W) I/O operations of each storage device's workload.

16. The method of claim 14, wherein:
predicting each storage device's performance characteristics includes using one or more prediction models built for each storage device, wherein each prediction model is built by processing each storage device's telemetry information using one or more machine learning techniques;
the one or more machine learning techniques includes at least a non-linear regression learning technique, amongst other machine learning techniques; and
the non-linear regression technique includes at least one or more of a random forest and a neural network, amongst other machine learning techniques.

17. The method of claim 16, wherein:
the predicted performance characteristics are based on at least one or more of each storage device's system configurations and workloads present in the collected telemetry information, amongst other data;
the telemetry information processed by the one or more machine learning techniques is augmented with each storage device's uncollected and validated telemetry information.

18. The method of claim 17, wherein each storage device's uncollected and validated telemetry information includes at least one or more of each storage device's validated system configurations and validated workloads not present in each storage device's collected telemetry information.

19. The method of claim 11 further comprising:
for one or more sets of storage devices, building one or more system configuration prediction models configured to determine probabilities of each recommended storage device configuration meeting each storage device's SL performance tiers under one or more different workload conditions, wherein each set of storage devices.

20. The method of claim 19, wherein:
each different workload condition is based on one or more anticipated workloads; and
each of the one or more anticipated workloads is predicted using one or more machine learning techniques to process one or more of: a customer type associated with each requested performance characteristic, the collected telemetry information, and uncollected telemetry information.

\* \* \* \* \*